(12) United States Patent
Ancin

(10) Patent No.: US 6,721,458 B1
(45) Date of Patent: Apr. 13, 2004

(54) ARTIFACT REDUCTION USING ADAPTIVE NONLINEAR FILTERS

(75) Inventor: Hakan Ancin, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/549,854

(22) Filed: Apr. 14, 2000

(51) Int. Cl.[7] .............................................. G06K 9/40
(52) U.S. Cl. .................. 382/261; 358/326; 358/462; 358/463; 358/466; 358/539; 382/112; 382/272; 382/275
(58) Field of Search .............................. 382/165, 167, 382/169–171, 260–267, 270–25, 112; 358/3.26, 505, 533, 537, 539, 462–463, 466

(56) References Cited

U.S. PATENT DOCUMENTS

| | | | |
|---|---|---|---|
| 4,503,461 A | 3/1985 | Nishimura | |
| 4,736,439 A | 4/1988 | May | |
| 4,782,399 A | 11/1988 | Sato | |
| 4,783,840 A * | 11/1988 | Song | 382/261 |
| 5,001,576 A | 3/1991 | Tanaka et al. | |
| 5,022,091 A | 6/1991 | Carlson | |
| 5,062,142 A | 10/1991 | Meckley | |
| 5,068,746 A * | 11/1991 | Ohsawa | 358/443 |
| 5,216,521 A * | 6/1993 | Birgmeir | 358/447 |
| 5,231,677 A | 7/1993 | Mita et al. | |
| 5,379,074 A * | 1/1995 | Hwang | 348/606 |
| 5,379,130 A | 1/1995 | Wang et al. | |
| 5,384,648 A | 1/1995 | Seidner et al. | |
| 5,384,865 A | 1/1995 | Loveridge | |
| 5,424,783 A | 6/1995 | Wong | |
| 5,450,217 A * | 9/1995 | Eschbach et al. | 358/518 |
| 5,475,497 A * | 12/1995 | Neuhoff et al. | 358/406 |
| 5,535,013 A | 7/1996 | Murata | |
| 5,596,655 A * | 1/1997 | Lopez | 382/173 |
| 5,638,139 A | 6/1997 | Clatanoff et al. | |
| 5,687,006 A | 11/1997 | Namizuka et al. | |
| 5,732,159 A * | 3/1998 | Jung | 382/262 |
| 5,767,978 A * | 6/1998 | Revankar et al. | 358/296 |
| 5,787,210 A * | 7/1998 | Kim | 382/309 |
| 5,798,846 A | 8/1998 | Tretter | |
| 5,799,112 A | 8/1998 | de Queiroz et al. | |
| 5,818,964 A | 10/1998 | Itoh | |
| 5,822,467 A * | 10/1998 | Lopez et al. | 382/261 |
| 5,852,678 A | 12/1998 | Shiau et al. | |
| 5,911,004 A | 6/1999 | Ohuchi et al. | |
| 5,974,197 A * | 10/1999 | Lee et al. | 382/268 |
| 5,987,484 A * | 11/1999 | Sherry et al. | 708/300 |
| 6,055,340 A * | 4/2000 | Nagao | 382/261 |
| 6,064,768 A | 5/2000 | Hajj et al. | |
| 6,160,913 A * | 12/2000 | Lee et al. | 382/176 |
| 6,259,823 B1 * | 7/2001 | Lee et al. | 382/268 |
| 6,347,161 B1 * | 2/2002 | Mancuso | 382/261 |
| 6,349,153 B1 * | 2/2002 | Teo | 382/294 |
| 6,389,163 B1 * | 5/2002 | Jodoin et al. | 382/173 |
| 6,456,325 B1 * | 9/2002 | Hayashi | 348/234 |
| 6,483,893 B1 * | 11/2002 | Achtnig et al. | 378/98.12 |
| 6,522,425 B2 * | 2/2003 | Yoshidome | 358/1.9 |
| 6,546,132 B1 * | 4/2003 | Bhattacharjya et al. | 382/167 |

* cited by examiner

Primary Examiner—Bhavesh M. Mehta
Assistant Examiner—Gregory Desire
(74) Attorney, Agent, or Firm—Michael T. Gabrik

(57) ABSTRACT

Adaptive filtering techniques for hardware or software implementation, which selectively use median and low-pass filters to reduce artifacts based on local document features, are disclosed. Specific techniques for low- and high-resolution documents are provided. A fast and memory efficient algorithm for computing the median on a 3×3 pixel neighborhood is also disclosed, and is used in the filtering technique for high-resolution documents.

36 Claims, 6 Drawing Sheets

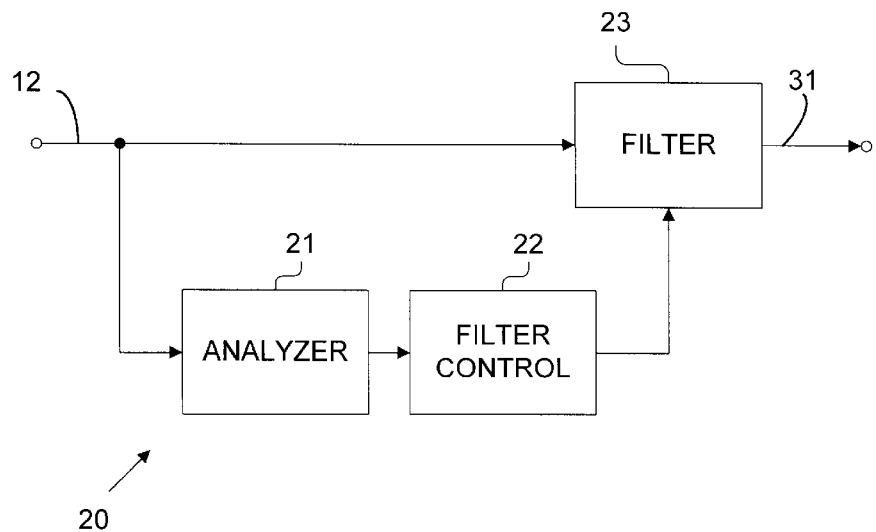
FIG. 6
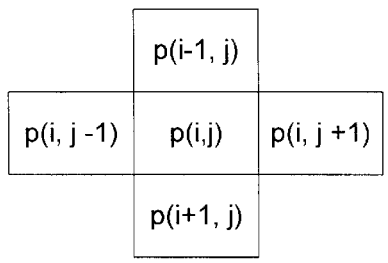
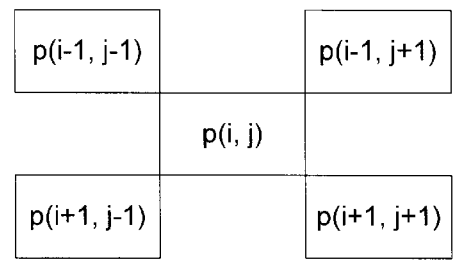
FIG. 8A                    FIG. 8B
| 1 | 2 | 1 |
|---|---|---|
| 2 | 4 | 2 |
| 1 | 2 | 1 |
| 2 | 1 | 2 |
|---|---|---|
| 1 | 4 | 1 |
| 2 | 1 | 2 |
FIG. 9A                    FIG. 9B

ARTIFACT REDUCTION USING ADAPTIVE NONLINEAR FILTERS

BACKGROUND OF THE INVENTION

1. Field of the Invention

This invention relates to adaptive filtering techniques for reducing artifacts in scanned or copied documents that contain images, graphics and/or text. More particularly, this invention relates to methods and apparatuses for selectively applying different types of filters based on local document features to reduce artifacts, such as moiré, scanner noise, and/or CCD noise, in documents. The invention also relates to a method of rapidly computing a median filter. The invention further relates to programs of instructions for implementing the adaptive filtering techniques and filter computation method.

2. Description of the Related Art

Many scanned documents are mixed-mode, meaning that they contain at least two of the following types of data: text, graphics and image. When scanned, the scanned representations of such documents may contain artifacts that do not exist in the original. The source of these artifacts varies. If the original document is a screened document, then moiré artifacts may occur in the scanned representation. Other types of artifacts may also appear on scanned representations of mixed-mode documents. Such artifacts include noise that originates from the charge coupled device (CCD) of the scanner or from scanner mechanics.

Moiré artifacts result whenever two geometrically-regular patterns are superimposed. Moiré often manifests itself as a ripple-like pattern in scanned representations of screened documents because the geometrically-regular structure of the screened document is superimposed with the geometrically-regular pattern of scanning.

The nature of the moiré that results from scanning depends on a number of factors including: (1) the resolution of the geometrically-regular structure of the screened document, i.e., the screen frequency, (2) the resolution of the geometrically-regular pattern for the scanning process, i.e., the scan frequency, (3) the relative angle between these two patterns, i.e., the screen angle, and (4) the characteristics of the process used to render the scanned representation. Moiré can be reduced by decreasing the screen frequency, increasing the scan frequency, and/or carefully selecting the screen angle, but these simple techniques are generally unsatisfactory.

A tradeoff between screen frequency and scan frequency is generally unable to achieve a satisfactory reduction in moiré because, on the one hand, a decrease in screen frequency reduces the resolution of the screened document and, on the other hand, an increase in scan frequency greatly increases the amount of resources required to process and store the scanned representation. In some applications such as high-quality printed publications, screen frequencies in excess of 200 lines per inch (about 79 lines per centimeter) are used, making it essentially impossible to reduce moiré by merely increasing the scan frequency.

A careful selection of screen angle is generally unable to achieve a satisfactory reduction in moiré because the angle is difficult to select precisely in many applications. Precise selection is difficult because the relative orientation of the screened image with respect to the orientation of the scanning apparatus is difficult to control precisely. The problem is even greater in color applications where the screen angle for three or more colors must be very carefully selected.

Most methods in the literature use low-pass filtering techniques to reduce moiré. While these techniques may reduce moiré artifacts in image regions, they also tend to reduce perceptual quality of text and graphics regions. That is, if a low-pass filter is applied uniformly to the scanned representation, the degree of filtering required to achieve an acceptable reduction in moiré usually results in an unacceptable reduction in resolution. Other methods have been proposed which rely on median filtering. However, such methods may not reduce moiré artifacts as desired.

Thus, there is a need for an effective adaptive filtering technique that produces documents with improved perceptual quality, and that is particularly suitable for mixed-mode documents.

SUMMARY OF THE INVENTION

Objects of the Invention

Therefore, it is an object of the present invention to provide improved adaptive filtering techniques that combine various nonlinear filtering techniques to produce documents with improved perceptual quality, and that are particularly useful on scanned or copied representations of mixed-mode documents.

It is another object of this invention to provide improved adaptive filtering techniques which selectively apply different types of filters based on local features to reduce artifacts in scanned or copied representations of mixed-mode documents.

It is a further object of this invention to provide adaptive filtering techniques suited for low- and high-resolution mixed-mode documents, respectively.

It is still another object of this invention to provide a method for fast generation of a median filter.

Summary

According to one aspect of this invention, a method for producing an output representation of a mixed-mode document with reduced artifacts is provided. The method comprises computing, for each of a plurality of pixels representing the document, a first average gray scale value of a first pixel neighborhood and a second average gray scale value of a second pixel neighborhood; comparing the difference between the computed first average gray scale value and a value of that pixel with a predetermined threshold value; and based on the result of the comparison, applying either a median filter to the first pixel neighborhood, a first low-pass filter to the second pixel neighborhood, or a second low-pass filter to the first pixel neighborhood, to produce an output representation of the document with reduced artifacts. The method is particularly applicable to a high-resolution representation of a mixed-mode document.

In a preferred embodiment, the first average gray scale value is computed on a 3×3 neighborhood of pixels, centered on but excluding that pixel, and the second average gray scale value is computed on a 3×5 neighborhood centered on and double weighting that pixel.

Preferably, the median filter is applied if the difference between the computed first average gray scale value and the value of that pixel is greater than or equal to the predetermined threshold value, and either the first low-pass filter or the second low-pass filter is applied based on a comparison between (i) the difference between the computed first average gray scale value and a gray scale value of that pixel and (ii) the difference between the computed second average gray scale value and the gray scale value of that pixel.

Preferably, the first low-pass filter is represented by a weighted average gray scale value of the second pixel neighborhood, and the second low-pass filter is represented by an average gray scale value of the first pixel neighborhood.

In another aspect, the invention involves a method for producing an output representation of mixed-mode document with reduced artifacts, that is particularly applicable to a low-resolution representation of such document. The method comprises computing, for each of a plurality of pixels representing the document, a first average gray scale value of a first pixel neighborhood and a second average gray scale value of a second pixel neighborhood; comparing the difference between the computed first average gray scale value and a value of that pixel with a predetermined threshold value; and based on the result of the comparison, applying either a first filter kernel to the first pixel neighborhood, a second filter kernel to the first pixel neighborhood, a third filter kernel to the first pixel neighborhood, a first low-pass filter to the second pixel neighborhood, or a second low-pass filter to the first pixel neighborhood, to produce an output representation of the document with reduced artifacts.

In a preferred embodiment, the first filter kernel is applied if a first sub-condition, indicating that horizontal and vertical edges are to be preserved, is satisfied, the second filter kernel is applied if the first sub-condition is not satisfied but a second sub-condition, indicating that slanted edges are to be preserved, is satisfied, and the third filter kernel is applied if neither the first nor the second sub-condition is satisfied.

Preferably, either the first, second or third filter kernels is applied if the difference between the computed first average gray scale value and the value of that pixel is greater than or equal to the predetermined threshold value, and either the first or second low-pass filter is applied if the difference between the computed first average gray scale value and the value of that pixel is less than the predetermined threshold value.

Preferably, the first low-pass filter, represented by a weighted average gray scale value of the second pixel neighborhood, is applied if the second sub-condition is satisfied, and the second low-pass filter, represented by an average gray scale value of the first pixel neighborhood, is applied if the second sub-condition is not satisfied.

Other aspects of the invention include apparatuses for implementing the adaptive filtering methods described above. Such apparatuses comprise a filter device, an analyzer, and a filter control to perform the processing.

In yet another aspect of the invention, each of the above-described methods may be embodied in a program of instructions (e.g., software) which is stored on, or conveyed to, a computer or other processor-controlled device for execution. Alternatively, the method(s) may be implemented using hardware or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 6 is a functional block diagram illustrating several components in a processor, according to embodiments of the invention;

FIGS. 8A and 8B are schematic illustrations of pixel kernels on which different structure-preserving median filters are computed;

FIGS. 9A and 9B schematically illustrate low-pass filter kernel weights to be applied based on the detected structure within a predetermined pixel neighborhood.

DESCRIPTION OF THE PREFERRED EMBODIMENTS

I. System Components

Figure 1:
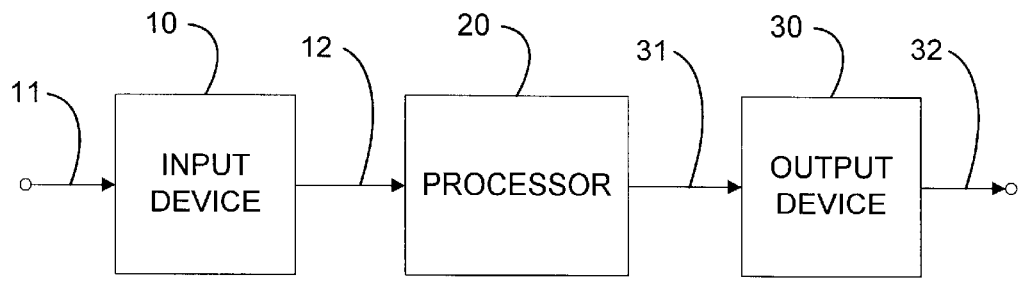
FIG. 1 is a functional block diagram illustrating major components in a document reproduction system.

FIG. 1 illustrates major components in a typical document reproduction system, which may be implemented in a photocopier or computer system. Input device 10 receives from path 11 signals representing an original screened document and generates along path 12 an input representation of this document. Processor 20 receives this input representation from path 12 and, in response, generates along path 31 an output representation of the original document. Output device 30 receives this output representation from path 31 and, in response, generates along path 32 a rendition of the original document. The present invention is directed toward improving the quality of this rendition by reducing artifacts on scanned or copied documents.

Input device 10 may be a scanner, camera, or other suitable document capture device. If input device 10 is an optical scanner, the signals received from path 11 are optical in nature and the input representation generated along path 12 conveys values of optical samples taken at locations along multiple scan lines.

Output device 30 may be essentially any type of printer, plotter or display, including the printer portion of a photocopier. If output device 30 is an inkjet or laser printer, for example, the rendition generated along path 32 is the printed document. If output device 30 is a cathode ray tube (CRT) or thin-film transistor (TFT) display, for example, the rendition generated along path 32 is the representation formed on the display device. While the disclosure is primarily directed to output representations produced by printers or photocopiers, many of the principles and features of the present invention may be applied in systems incorporating other types of output devices.

Processor 20 processes the input representation to generate the output representation, which is intended to be a high-fidelity rendition of the original document that is substantially free of visible artifacts. Processor 20 may be implemented in a variety of ways including by software and/or hardware in a photocopier or general-purpose computer.

Figure 2:
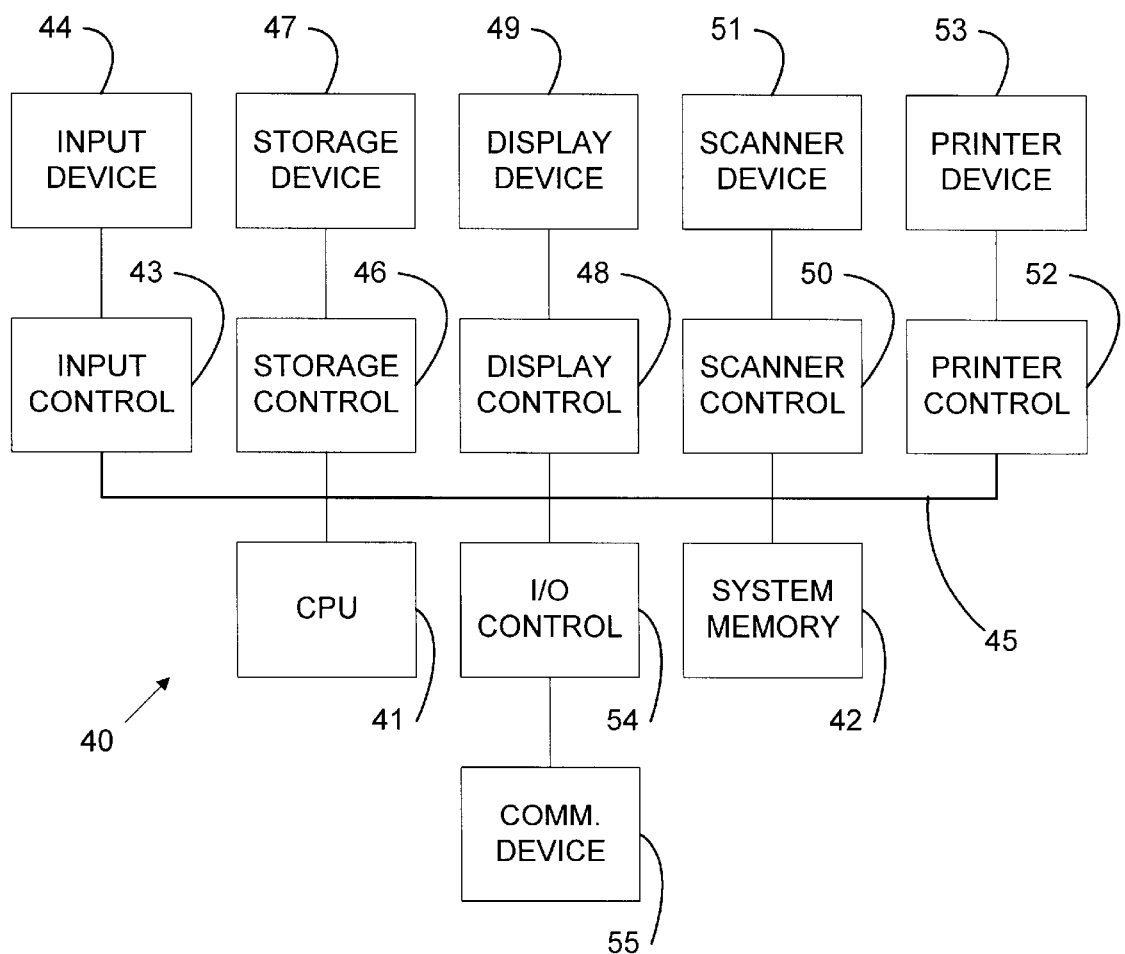
FIG. 2 is a functional block diagram illustrating components in a typical computer system that is suitable for carrying out various aspects of the present invention.

FIG. 2 shows the general configuration of a typical computer system 40 which may be used to implement a document reproduction system according to the present invention. Central processing unit (CPU) 41 provides computing resources and controls the computer. CPU 41 may be implemented with a microprocessor or the like, and may also include a graphics processor and/or a floating point coprocessor for mathematical computations. Computer system 40 further includes system memory 42 which may be in the form of random-access memory (RAM) and/or read-only memory (ROM). Input control 43 represents an interface to one or more input devices 44, such as a keyboard, mouse or stylus. A storage control 46 is an interface to a storage device 47 that includes a storage medium such as magnetic tape or disk, or an optical medium that may be used to record programs of instructions for operating systems, utilities and applications, and may include embodiments of programs that implement various aspects of the present invention. Display control 48 provides an interface to display device 49 which may be a CRT or TFT display. Scanner control 50 represents an interface to scanner device 51 that is an input device such as an optical scanner. Printer control 52 represents an interface to printer device 53 that is an output device like an ink-jet or laser printer. I/O control 54 interfaces with communication device 55 which may be a modem or other network connection. Programs that implement various aspects of this invention may be transmitted to computer system 40 from a remote location (e.g., a server) over a network.

In the embodiment shown, all major system components connect to bus 45 which may represent more than one physical bus. For example, some personal computers incorporate only a so-called Industry Standard Architecture (ISA) bus. Other computers incorporate an ISA bus as well as a higher bandwidth bus conforming to some bus standard such as the VESA local bus standard or the PCI local bus standard. Preferably, display control 48 connects to a high-bandwidth bus to improve the speed of display. A bus architecture is not required to practice the present invention.

Devices like scanner device 51 may serve as input device 10 and devices like display device 49 or printer device 53 may serve as output device 30. Other components shown in the figure may be used to implement processor 20. Processor 20 may also be integrated with a scanner and a printer in a single unit, such as in a photocopier.

As previously noted, the functions required to practice various aspects of the present invention can be implemented in processor 20 in a wide variety of ways, such as with discrete logic components, one or more application specific integrated circuits (ASICs), digital signal processors, program-controlled processors, or the like. In the form of hardware, processor 20 can be embodied in computer 40 itself or on an option card that can be inserted into an available computer card slot. In the form of software, processor 40 can be loaded into computer 40 from storage device 47 and executed by CPU 41. Various aspects of the invention can be conveniently implemented in a type of program known as a device driver. More broadly, such software may be conveyed by a variety machine-readable medium including magnetic tape or disk, optical disc, network paths, infrared signals, as well as other communication paths throughout the electromagnetic spectrum.

In as much as the filtering techniques of the present invention may be implemented using hardware, software, or combination thereof, it is to be understood that the block and flow diagrams show the performance of certain specified functions and relationships thereof. The boundaries of these functional blocks have been arbitrarily defined herein for convenience of description. Alternate boundaries may be defined so long as the specified functions are performed and relationships therebetween are appropriately maintained. The diagrams and accompanying description provide the functional information one skilled in the art would require to fabricate circuits or to write software code to perform the processing required.

II. Fast Median Filter

Figures 3, 4:
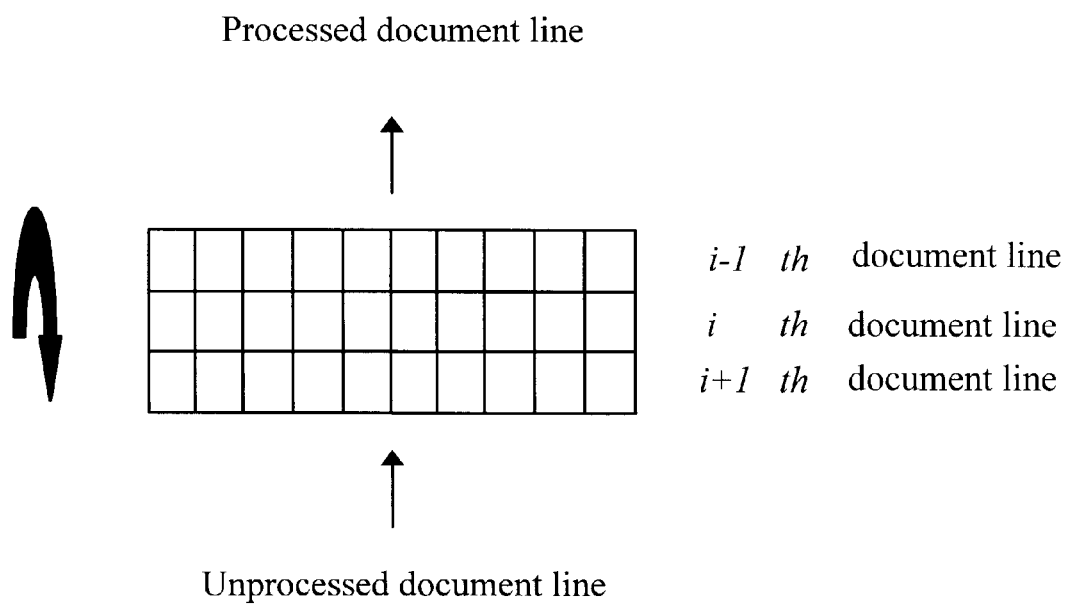
FIG. 3 is a schematic illustration of a three document-line buffer that is processed by a median filter, constructed in accordance with embodiments of the invention.
FIG. 4 is a schematic illustration of labeled pixels in a 3×3 neighborhood.

This section describes a very fast and memory efficient algorithm for computing the median of pixels in a predetermined neighborhood, e.g. a 3×3 neighborhood of pixels, based on pixel gray scale values. An efficient implementation for a 3×3 median filter algorithm requires only a three line buffer in memory and revolves this buffer when a new line enters the buffer window, as shown in FIG. 3. A band-based processing scheme enables memory efficient filtering of high-resolution documents of, e.g., 600 dpi or higher. The algorithm is particularly well suited for software implementation, although a hardware implementation is also possible.

The median filter is applied to a pixel representation of a document. In a preferred embodiment, the median filter computes medians in a 3×3 window for the $i^{th}$ document line, as the window is slid horizontally one column at a time until the window reaches the end of the $i^{th}$ document row. The process begins by computing the median of the pixels in, say, the first three columns of lines (i−1), i and (i+1). This window is then slid horizontally one column, so that one new 3×1 column of pixels enters the window and one 3×1 column of pixels leaves the window. Two columns from the "previous" window remain in the "new" window. The median is then computed on the pixels in the new window. This process continues until the window reaches the end of the $i^{th}$ row, after which the processed line (i−1) is removed from the buffer and unprocessed line (i+2) enters the buffer and medians are computed for the $(i+1)^{th}$ document line. Document lines are revolved in the direction of the arrow in FIG. 3.

The present invention provides a very fast and memory efficient algorithm for computing the median of the pixel neighborhood in each window. Initially, the algorithm sorts the gray scale values of the pixels in each column in the window. Each of these sorted triplets are stored to determine the median gray scale value of the pixels in the 3×3 window. For ease of description, the nine pixels of a 3×3 window are labeled as shown in FIG. 4.

Triplets {a, b, c}, {d, e, f} and {g, h, j} correspond to the three columns of pixels which will be sorted. Assume that the sorted triplets, each in ascending order of gray scale value, are denoted by: {a, c, b}, {e, d, f} and {h, g, j}. We can further sort the center gray-scale-value pixels from the respective columns. Assuming that the triplets above are in ascending order of center gray-scale-value pixels, this order is given by:

$$I_c \leq I_d \leq I_g,$$

where $I_x$ is the gray scale value of pixel x.

Based on this triplet ordering, it can be shown that pixels a, c, g and j cannot be the median of the 3×3 pixel neighborhood. It can further be shown that pixel b, d, e, f or h can be the median of the 3×3 pixel neighborhood, depending on which condition shown in Table 1 is satisfied. Table 1 lists the possible orderings of pixels according to gray scale values within the 3×3 neighborhood shown in FIG. 4, based on the assumptions made above. The first column of the table lists the pixel having the median gray scale value if the condition in the second column is satisfied. The third column lists the first five pixels according to gray scale value up to the median pixel which is listed last.

TABLE 1

| Median pixel | Conditions on pixel gray scale values | Ordered pixels up to the median pixel |
| --- | --- | --- |
| b | $I_b \geq I_c, I_b \geq I_h, I_d \geq I_b$ | a,c,e,h,b |
| b | $I_h \geq I_b, I_b \geq I_d, I_f \geq I_b$ | a,c,e,d,b |
| h | $I_h \geq I_c, I_d \geq I_h, I_h \geq I_b$ | a,c,b,e,h |
| h | $I_h \geq I_d, I_b \geq I_h, I_f \geq I_h$ | a,c,e,d,h |
| e | $I_c \geq I_b, I_c \geq I_h$ | a,c,b,h,e |
| f | $I_h \geq I_f, I_b \geq I_f$ | a,c,e,d,f |
| d | $I_d \geq I_b, I_h \geq I_d$ | a,c,b,e,d |
| d | $I_b \geq I_d, I_d \geq I_h$ | a,c,e,h,d |

Figure 5:
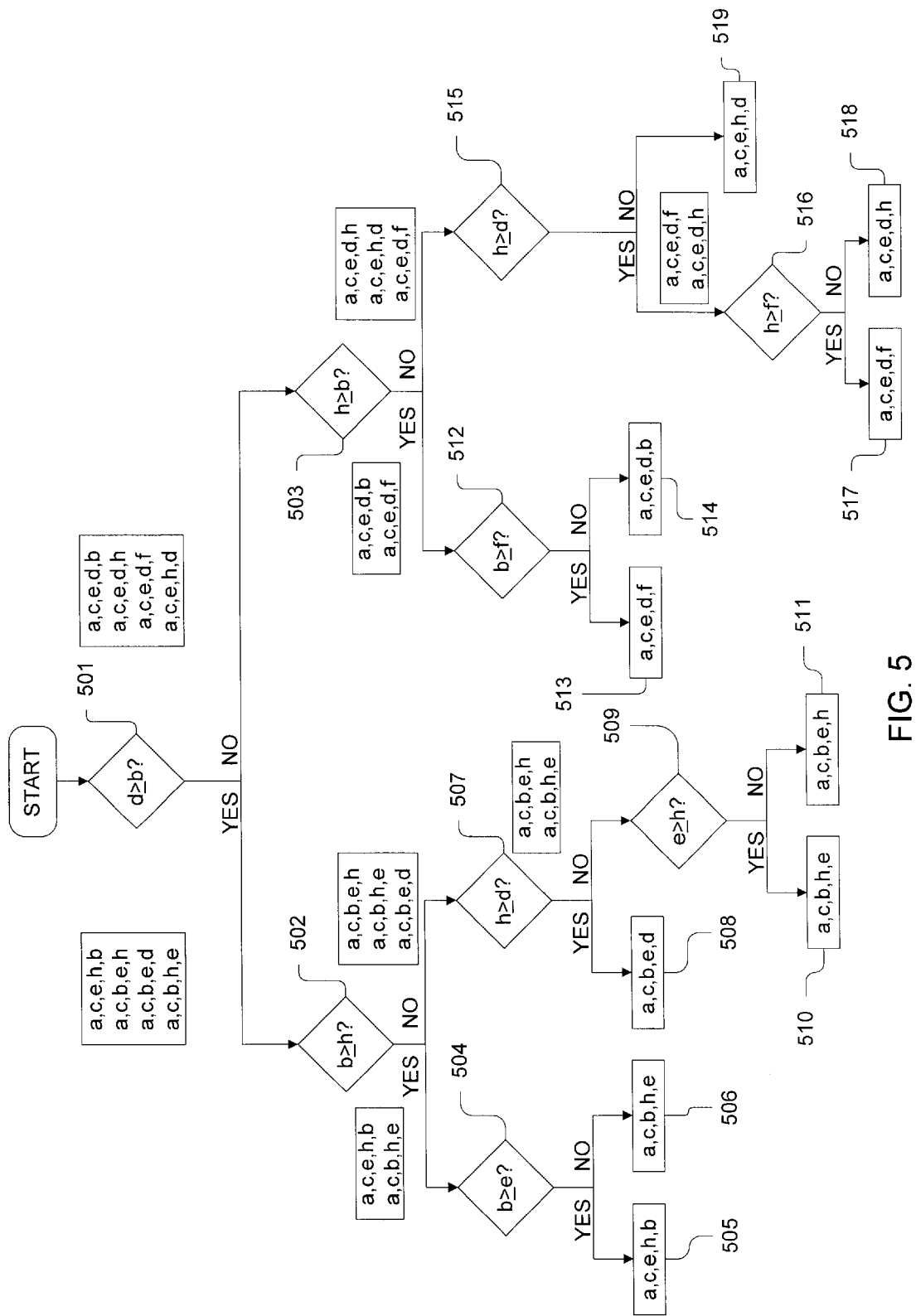
FIG. 5 is a decision tree for determining the median of three sorted 3×1 pixel columns, in accordance with embodiments of the invention.

The conditions in Table 1 can be further simplified and expressed in the form of a decision tree or flow chart, shown in FIG. 5. The decision tree determines the median of a 3×3 neighborhood of pixels, grouped into three columns of three pixels each, each column of pixels being sorted according to gray scale value. The boxes along the decision branches show the possible candidates for the median pixel, i.e., the right-most pixel in each line, and other pixels that have smaller gray scale values to the left of the respective median pixel candidates.

Referring to FIG. 5, the decision process begins at step 501 where it is determined whether the gray scale value of pixel d is greater than or equal to the gray scale value of pixel b. If so, the possible median pixels are: b, h, d and e, and the decision process proceeds to step 502. If not, the possible median pixels are: b, h, f and d, and the decision process proceeds to step 503.

In step 502, it is determined whether the gray scale value of pixel b is greater than or equal to the gray scale value of pixel h. If so, the possible median pixels is reduced to b and e. If not, the possible median pixels are h, e and d. If the determination in step 502 is "yes," the gray scale values of pixels b and e are compared in step 504. If the gray scale value of pixel b is greater than or equal to the gray scale value of pixel e, the median pixel is b, as shown in box 505. If the decision in step 504 is "no," the median pixel is e, as shown in box 506.

Returning to step 502, if the gray scale value of pixel h is less than the gray scale value of pixel b, the possible median pixels are h, e and d. Thus, the decision process proceeds to step 507 where it is determined if the gray scale value of pixel h is greater than or equal to the gray scale value of pixel d. If so, the median pixel is d, as shown in box 508. If not, a further comparison is made between pixels h and e in step 509. If the gray scale value of pixel e is greater than or equal to the gray scale value of pixel h, the median pixel is e (box 510); otherwise, the median pixel is h (box 511).

Returning to step 503, it is determined if the gray scale value of pixel h is greater than or equal to the gray scale value of pixel b. If so, either pixel b or f is the median pixel and the decision process proceeds to step 512. If it is determined in step 512 that the gray scale value of pixel b is greater than or equal to that of pixel f, pixel f is the median pixel (box 513); otherwise pixel b is the median pixel (box 514). If the result of the determination in step 503 is "no," then the possible median pixels are: h, d and f, and the process continues to step 515. If it is determined in step 515 that the gray scale value of pixel h is greater than or equal to that of pixel d, either pixel f or h is the median pixel, which is determined in step 516. If the gray scale value of pixel h is greater than or equal to that of pixel f, the median pixel is f (box 517); otherwise, it is pixel h (box 518). If the result of the determination in step 515 is "no," then the median pixel is d (box 519).

In addition to showing the pixel having the median gray scale value for a given set of conditions, boxes 505, 506, 508, 510, 511, 513, 514, 517, 518 and 519 also illustrate the pixels having the four lowest gray scale values leading up to the median pixel.

The median filter algorithm described above is a generalized example based on the assumptions given. The specific pixel gray scale values compared at the various decision branches, as well as the median pixel candidates along the way will vary depending on the initial sorting.

III. Artifact Reduction by Adaptive Filtering

This section describes two embodiments for reducing artifacts, such as moiré and CCD noise, on scanned documents. The first embodiment provides more moiré reduction than the second, but requires a relatively high-resolution to avoid reducing the quality of text or graphics regions. The first embodiment is therefore suitable for high-resolution document representations, e.g., 600 dpi or higher. The second embodiment may provide better text and graphics quality for lower resolution representations, but some moiré may remain. The second embodiment is therefore suitable for low-resolution document representations, e.g., less than 600 dpi.

FIG. 6 is a functional block diagram illustrating several major components in processor 20 which may be used to carry out the filtering operations in accordance with the first and second embodiments mentioned above. Analyzer 21 receives from path 12 the input representation of an original document and analyzes information derived from this input representation to classify regions of the document according to content. Filter control 22 receives the results of analyzer 21 and generates a filter-control signal that is used to control the operation of filter 23. Filter 23 applies a particular two-dimensional filter to a plurality of regions in the input representation received from path 12 to generate along path 31 an output representation that renders the original representation in a form that is substantially free of visible artifacts. The type and kernel size, or number of taps, of the applied filter is varied according to the control signal received from filter control 22. The criteria for determining which filter to apply to a particular document region is described in more detail below.

A. Artifact Reduction on High Resolution Documents

As previously noted, one way to reduce moiré on scanned documents is to apply a low-pass filter to a digital representation of the document. However, this operation not only reduces the artifacts but also reduces the quality of graphics and text regions due to the smoothing caused by the filtering operation. One aspect of the present invention overcomes this problem by providing a method in which different filters are selectively applied based on local document characteristics. When applied to high-resolution documents, these filters reduce artifacts (e.g., moiré and noise) without reducing the quality of image, text and graphics regions.

This new method utilizes median and low-pass filters, depending on local document characteristics. At high frequencies moiré is similar to salt-and-pepper type noise, which is very similar in appearance to noise that can be caused by the CCD, and at low frequencies moiré appears as large pixel clusters. Median filters are good at reducing salt-and-pepper noise without harming edge pixels, while low-pass filters are good at eliminating larger pixel clusters.

In accordance with this aspect of the invention, local document features are computed within 3×3 and 3×5 neighborhoods. These local features and predetermined thresholds are used to select the appropriate filter to apply to corresponding document regions.

Figure 7:
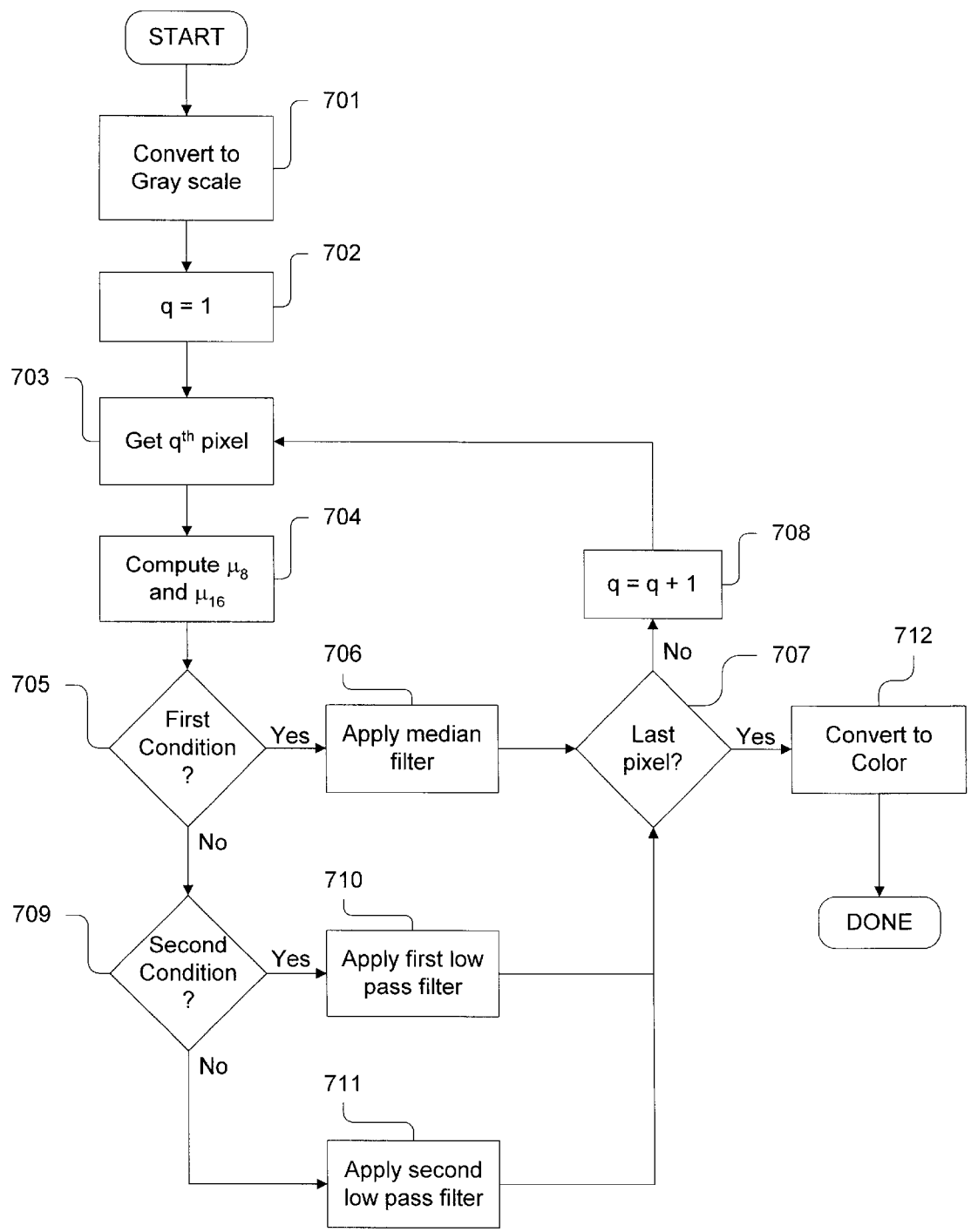
FIG. 7 is a flow chart illustrating a method of adaptive filtering of high-resolution documents, according to embodiments of the invention.

FIG. 7 is a flow chart illustrating an adaptive filtering scheme according to this embodiment of the invention. The filters are applied on pixel gray scale values. Thus, if the original document to be filtered is a color document, the process begins at step 701 where the color document is initially converted to gray scale. (After filtering, an initial color document is converted back to color, as will be explained below.) For an RGB document, the gray scale value of a pixel is determined based on its RGB values. For each pixel p(i, j), the median of its R(i, j), G(i, j) and B(i, j) values is determined and whichever color value corresponds to the median, then that value is weighted by a factor of two in the gray scale computation. For example, if the red value is the median of {R(i, j), G(i, j) and B(i, j)}, then the pixel gray scale value I(i, j) is computed as: (2R(i, j)+G(i, j)+B(i, j))/4. Gray scale computation with these weighted values is very suitable for ASIC implementation. Moreover, in the experience of the inventor determining weighted values based on the median of pixel RGB values improves overall document quality for artifact reduction purposes.

In step 702 pixel variable q is initialized to 1. The process flow then enters a loop where each pixel is examined and the appropriate filtering applied to a local pixel neighborhood. In step 703 the $q^{th}$ pixel is obtained. For each pixel, $\mu_8(i, j)$ and $\mu_{16}(i, j)$ are computed in step 704. That is, the average gray scale value of a 3×3 neighborhood, centered on but excluding pixel q, is computed, and the average gray scale value of a 3×5 neighborhood, centered on and double weighting pixel q, is computed. In step 705 a first condition is checked. If, in step 705, it is determined that the absolute difference between $\mu_8(i, j)$ and p(i, j) is greater than or equal to a threshold value $T_1$ then, in step 706 a median filter, preferably of the type described in section II, is applied. That is, the median gray scale value of the 3×3 neighborhood is assigned to m(i, j) which represents the value of p(i, j) after filtering. If there are more pixels to examine, as determined in step 707, then q is incremented in step 708, after which the process returns to step 703 where the next pixel is obtained.

Returning to step 705, if the decision in that step is "no," then a second condition is checked in step 709. Specifically, it is determined in step 709 if the absolute difference between $\mu_8(i, j)$ and I(i,j) is less than the absolute difference between $\mu_{16}(i, j)$ and I(i, j). If so, then in step 710 a first low-pass filter is applied by assigning the weighted average gray scale value of the 3×5 neighborhood to m(i, j). Then the process continues with step 707. If, however, the decision in step 709 is "no," then a second low-pass filter is applied in step 711; that is, the average gray scale value of the 3×3 neighborhood is assigned to m(i, j). Then the process continues with step 707.

Symbolically, the condition or rule given in steps 705 and 709 as to what type of filter to apply to a specific document region in steps 706, 710 and 711 is stated as follows:

if $|\mu_8(i, j)-p(i, j)| \geq T_1$ then the median gray scale value of the 3×3 neighborhood is assigned to m(i, j)

else if $|\mu_8(i, j)-I(i, j)|<|\mu_{16}(i, j)-I(i, j)|$ then the weighted average gray scale value of the 3×5 neighborhood is assigned to m(i, j)

else the average gray scale value of the 3×3 neighborhood is assigned to m(i, j), where threshold parameter $T_1$ (e.g., 15) is predetermined experimentally based on the characteristics of the scanner or other document capture device used, variable m(i, j) represents the filtered gray scale pixel value of the corresponding pixel neighborhood, and variables $\mu_8(i, j)$ and $\mu_{16}(i, j)$ represent average gray scale values that are computed by:

$$\mu_8(i, j) = \frac{1}{8}\left(\sum_{k=-1}^{1}\sum_{l=-1}^{1} p(i+k, j+l) - p(i, j)\right)$$

$$\mu_{16}(i, j) = \frac{1}{16}\left(\sum_{k=-1}^{1}\sum_{l=-2}^{2} p(i+k, j+l) - p(i, j)\right).$$

The average gray scale values given by the above equations are computed within 3×3 and 3×5 pixel neighborhoods, respectively. Only three document rows are used to reduce memory requirements for ASIC implementation. Such selective application of a low-pass or median filters provided good results for 600 dpi documents that were originally printed in various resolutions. When scanned document resolution increases, the kernel size for low-pass filtering operation can be easily increased.

After all of the pixels are examined and selective filter application is complete, the filtered pixel gray scale values are converted back to color RGB in step 712, if necessary, by the following equations:

$$R(i, j) = m(i, j) + (2R(i, j) + R(i, j-1) + R(i, j+1))/4 - I(i, j)$$

$$G(i, j) = m(i, j) + (2G(i, j) + G(i, j-1) + G(i, j+1))/4 - I(i, j)$$

$$B(i, j) = m(i, j) + (2B(i, j) + B(i, j-1) + B(i, j+1))/4 - I(i, j)$$

The previously-described filtering steps of FIG. 7 reduce artifacts on the gray scale values of scanned documents. However, when pixel gray scale values are converted back to color some of the artifacts may still be visible because moiré artifacts may still exist in each color channel. For this reason, the weighted average of pixel R, G and B values are computed from the current pixel and its two immediate neighbors during gray scale to color conversion, according to the equations given above.

The process then terminates.

B. Artifact Reduction on Low Resolution Documents

This section describes another filtering method that preserved edges better than the method described in the previous section, but requires more operations to determine the median gray scale values of the various pixel neighborhoods. The median filter described in section II and used in the artifact reduction algorithm described in section IIIA does not take into consideration specific structures that may exist in scanned documents. The artifact reduction algorithm described in this section takes into account vertical, horizontal and slanted structures.

The algorithm can apply different median filters that take into consideration "+"- and "×"-shaped structures that may exist in the text and graphics regions of the document. These filters are slower in execution speed for software implementations; however, the speed can be increased with an ASIC implementation.

FIG. 8A illustrates the pixel kernels on which a "+"-shaped structure preserving median filter is computed. That is, this kernel preserves horizontal and vertical edges. FIG.

8B illustrates the pixel kernels on which a "×"-shaped structure preserving median filter is computed. This kernel preserves slanted edges. The low-pass filter kernel weights to be applied based on a detected "+"-shaped structure are shown in FIG. 9A. Such filter weights provide emphasis on preserving horizontal and vertical edges. The low-pass filter kernel weights to be applied based on a detected "×"-shaped structure are shown in FIG. 9B. These filter weights provide emphasis on preserving slanted edges.

In taking the "+"-shaped structure into consideration, the median gray scale value of the five pixels shown in FIG. 8A are computed. The median gray scale value of the "+"-shaped structure is denoted by $m_c(i, j)$. In taking the "×"-shaped structure into consideration, the median gray scale value of the five pixels shown in FIG. 8B are computed. The median gray scale value of the "×"-shaped structure is denoted by $m_d(i, j)$. The final median filter value for a 3×3 neighborhood is determined by computing median value of pixels $m_c(i, j)$, $m_d(i, j)$, and $p(i, j)$.

Figure 10:
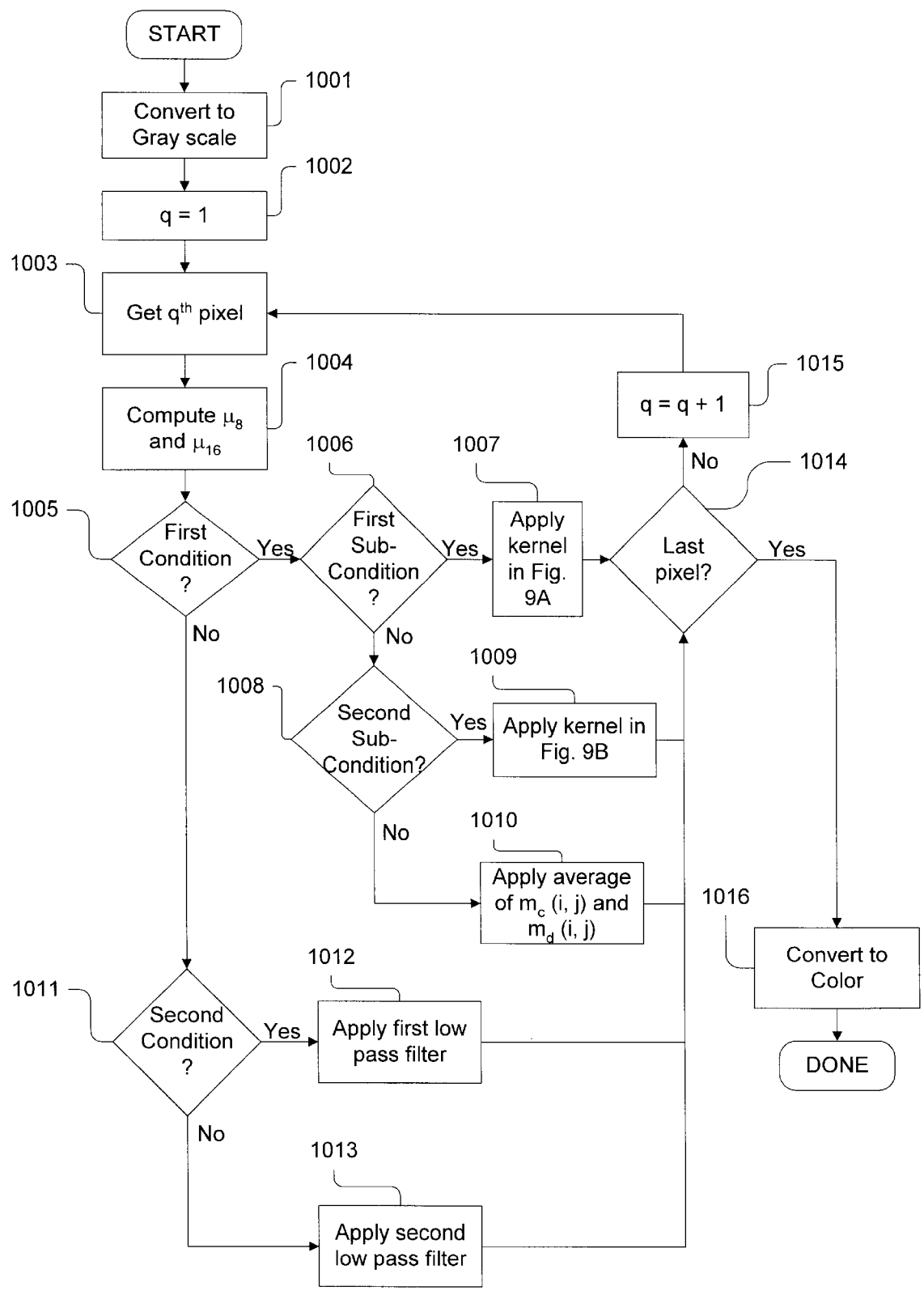
FIG. 10 is a flow chart illustrating a method of adaptive filtering of low-resolution documents, according to embodiments of the invention.

The adaptive filtering process according to this embodiment is shown in FIG. 10. Steps 1001 through 1004 are the same as steps 701 through 704 in FIG. 7. However, the actual filtering scheme differs as described below.

In step 1005 a first condition is checked. If, in step 1005, it is determined that the absolute difference between $\mu_8(i, j)$ and $p(i, j)$ is greater than or equal to $T_1$ then a first sub-condition is checked in step 1006; that is, if it is determined if the median of: (1) the median of the "+" pixels ($m_c(i, j)$), (2) the median of the "×" pixels ($m_d(i, j)$), and (3) $p(i, j)$ is $m_c(i, j)$, then the kernel shown in FIG. 9A is applied and the filter response is assigned to m(i, j) in step 1007. If, however, the median of the pixels considered in step 1006 is $m_d(i, j)$, as determined in step 1008, then the kernel in FIG. 9B is applied and the filter response is assigned to m(i, j) in step 1009. If the decision in step 1008 is "no," then the average of $m_c(i, j)$ and $m_d(i, j)$ is assigned to m(i, j) in step 1010.

Returning to step 1005, if the decision in that step is "no," then a second condition is checked in step 1011; that is, it is determined in step 1011 if the absolute difference between $\mu_8(i, j)$ and $I(i, j)$ is less than the absolute difference between $\mu_{16}(i, j)$ and $I(i, j)$. If so, then in step 1012 a first low-pass filter is applied by assigning the weighted average gray scale value of the 3×5 neighborhood to m(i, j). If, however, the decision in step 1011 is "no," then a second low-pass filter is applied by assigning the average gray scale value of the 3×3 neighborhood to m(i, j) in step 1013.

After each of the filtering steps 1007, 1009, 1010, 1012 and 1013, it is determined in step 1014 whether there are any more pixels. If so, q is incremented in step 1015 and the next pixel is obtained in step 1003. The process continues until all of the pixels have been examined.

Symbolically, the adaptive filtering conditions or rule for this embodiment are as follows:
if $|\mu_8(i, j)-p(i, j)| \geq T_1$ then
    if the median of $m_c(i, j)$, $m_d(i, j)$, and $p(i, j)$ is $m_c(i, j)$ then
        apply the kernel shown in FIG. 9A and assign the filter response to m(i, j)
    else if the median of $m_c(i, j)$, $m_d(i, j)$, and $p(i, j)$ is $m_d(i, j)$ then apply the kernel shown in FIG. 9B and assign the filter response to m(i, j)
    else assign the average of $m_c(i, j)$ and $m_d(i, j)$ to m(i, j)
else if $|\mu_8(i, j)-I(i, j)|<|\mu_{16}(i, j)-I(i, j)|$ then the weighted average gray scale value of the 3×5 neighborhood is assigned to m(i, j)
else the average gray scale value of the 3×3 neighborhood is assigned to m(i, j).

The parameters given above can be computed in a similar manner to the parameters given in previous section.

This artifact reduction algorithm preserves the edges better than the previously-described embodiment, especially in low-resolution documents. For this reason, it preserves the small font size text better than the previous embodiment. However, since it preserves small details better it may reduce moiré artifacts less than the previous embodiment.

IV. Conclusion

As the foregoing description demonstrates, the adaptive filtering techniques of the present invention are particularly well suited to reduce artifacts in scanned mixed mode documents. An appropriate artifact reduction method should be chosen based on the desired effect and scanned document resolution. A sharpening algorithm may be used to further process documents processed by the artifact reduction algorithms disclosed herein. The sharpening operation may be used to undo undesired smoothing effects of the artifact reduction process on text and graphics regions. Moreover, the filtering techniques of the present invention may be implemented in an ASIC, but may also be implemented on a personal computer using software or hardware.

While the invention has been described in conjunction with several specific embodiments, many further alternatives, modifications, variations and applications will be apparent to those skilled in the art that in light of the foregoing description. For example, the adaptive filtering techniques are not limited to color documents in RGB space, but may also be applied to color documents represented in other spaces, such as La*b* and/or YUV spaces. In the case of a document rendered in La*b* space the filtering is applied to the L-channel, and for a document in YUV space the filtering is applied to the Y-channel. Thus, the invention described herein is intended to embrace all such alternatives, modifications, variations and applications as may fall within the spirit and scope of the appended claims.

What is claimed is:

1. A method for producing an output representation of a mixed-mode document with reduced artifacts, comprising:
    for each of a plurality of pixels representing the document, computing a first average gray scale value of a first pixel neighborhood and a second average gray scale value of a second pixel neighborhood that overlaps the first pixel neighborhood;
    comparing the difference between the computed first average gray scale value and a value of that pixel with a predetermined threshold value; and
    based on the result of the comparison, applying either a median filter to the first pixel neighborhood, a first low-pass filter to the second pixel neighborhood, or a second low-pass filter to the first pixel neighborhood, to produce an output representation of the document with reduced artifacts.

2. The method of claim 1, wherein the pixel representation of the mixed-mode document is a high-resolution representation.

3. The method of claim 1, wherein the second pixel neighborhood is larger than the first pixel neighborhood.

4. The method of claim 1, wherein the median filter is applied if the difference between the computed first average gray scale value and the value of that pixel is greater than or equal to the predetermined threshold value.

5. The method of claim 4, wherein either the first low-pass filter or the second low-pass filter is applied based on a comparison between (i) the difference between the computed first average gray scale value and a gray scale value of that pixel and (ii) the difference between the computed second average gray scale value and the gray scale value of that pixel.

6. The method of claim 5, wherein the first low-pass filter is represented by a weighted average gray scale value of the second pixel neighborhood, and the second low-pass filter is represented by an average gray scale value of the first pixel neighborhood.

7. The method of claim 1, wherein the first average gray scale value is computed on a 3×3 neighborhood of pixels, centered on but excluding that pixel, and the second average gray scale value is computed on a 3×5 neighborhood centered on and double weighting that pixel.

8. A method for producing an output representation of mixed-mode document with reduced artifacts, comprising:
  for each of a plurality of pixels representing the document, computing a first average gray scale value of a first pixel neighborhood and a second average gray scale value of a second pixel neighborhood that overlaps the first pixel neighborhood;
  comparing the difference between the computed first average gray scale value and a value of that pixel with a predetermined threshold value; and
  based on the result of the comparison, applying either a first filter kernel to the first pixel neighborhood, a second filter kernel to the first pixel neighborhood, a third filter kernel to the first pixel neighborhood, a first low-pass filter to the second pixel neighborhood, or a second low-pass filter to the first pixel neighborhood, to produce an output representation of the document with reduced artifacts.

9. The method of claim 8, wherein the pixel representation of the mixed-mode document is a low-resolution representation.

10. The method of claim 8, wherein the first filter kernel is weighted to preserve horizontal and vertical edges in the output representation, and the second filter kernel is weighted to preserve slanted edges in the output representation.

11. The method of claim 10, wherein either the first, second or third filter kernels is applied if the difference between the computed first average gray scale value and the value of that pixel is greater than or equal to the predetermined threshold value, and wherein either the first or second low-pass filter is applied if the difference between the computed first average gray scale value and the value of that pixel is less than the predetermined threshold value.

12. The method of claim 11, wherein the first filter kernel is applied if a first sub-condition, indicating that horizontal and vertical edges are to be preserved, is satisfied, the second filter kernel is applied if the first sub-condition is not satisfied but a second sub-condition, indicating that slanted edges are to be preserved, is satisfied, and the third filter kernel is applied if neither the first nor the second sub-condition is satisfied.

13. The method of claim 12, wherein the first low-pass filter, represented by a weighted average gray scale value of the second pixel neighborhood, is applied if the second sub-condition is satisfied, and the second low-pass filter, represented by an average gray scale value of the first pixel neighborhood, is applied if the second sub-condition is not satisfied.

14. An apparatus for receiving an input signal conveying a mixed-mode document and, in response thereto, generating an output signal reproducing the mixed-mode document in a form having reduced artifacts, the apparatus comprising:
  a filter device including a median filter, a first low-pass filter, and a second low-pass filter;
  an analyzer that receives the input signal, computes, for each of a plurality of pixels representing the document, a first average gray scale value of a first pixel neighborhood and a second average gray scale value of a second pixel neighborhood that overlaps the first pixel neighborhood, compares the difference between the computed first average gray scale value and a value of that pixel with a predetermined threshold value, and outputs a signal indicative of the comparison; and
  a filter control that receives the comparison signal from the analyzer, and outputs a control signal to the filter device to apply either the median filter or a selected one of the low-pass filters based on the result of the comparison.

15. The apparatus of claim 14, wherein the filter control outputs a control signal to the filter device to apply the median filter if the signal received from the analyzer indicates that the difference between the computed first average gray scale value and the value of that pixel is greater than or equal to the predetermined threshold value.

16. The apparatus of claim 15, wherein the analyzer further compares (i) the difference between the computed first average gray scale value and a gray scale value of that pixel and (ii) the difference between the computed second average gray scale value and the gray scale value of that pixel, and wherein the filter control outputs a control signal to the filter device to apply either the first low-pass filter or the second low-pass filter based on the result of the further comparison.

17. The apparatus of claim 16, wherein the first low-pass filter is represented by a weighted average gray scale value of the second pixel neighborhood, and the second low-pass filter is represented by an average gray scale value of the first pixel neighborhood.

18. The apparatus of claim 14, wherein the first average gray scale value is computed on a 3×3 neighborhood of pixels, centered on but excluding that pixel, and the second average gray scale value is computed on a 3×5 neighborhood centered on and double weighting that pixel.

19. An apparatus for receiving an input signal conveying a mixed-mode document and, in response thereto, generating an output signal reproducing the mixed-mode document in a form having reduced artifacts, the apparatus comprising:
  a filter device including a first filter kernel, a second filter kernel, a third filter kernel, a first low-pass filter, and a second low-pass filter;
  an analyzer that receives the input signal, computes, for each of a plurality of pixels representing the document, a first average gray scale value of a first pixel neighborhood and a second average gray scale value of a second pixel neighborhood that overlaps the first pixel neighborhood, larger than the first pixel neighborhood, compares the difference between the computed first average gray scale value and a value of that pixel with a predetermined threshold value, and outputs a signal indicative of the comparison; and
  a filter control that receives the comparison signal from the analyzer, and outputs a control signal to the filter device to apply a selected one of the filter kernels or low-pass filters based on the result of the comparison.

20. The apparatus of claim 19, wherein the first filter kernel is weighted to preserve horizontal and vertical edges in the output representation, and the second filter kernel is weighted to preserve slanted edges in the output representation.

21. The apparatus of claim 20, wherein the filter control outputs a control signal to the filter device to apply either the first, second or third filter kernels if the signal received from the analyzer indicates that the difference between the computed first average gray scale value and the value of that pixel is greater than or equal to the predetermined threshold value, and wherein the filter control outputs a control signal to the filter device to apply either the first or second low-pass filter if the signal received from the analyzer indicates that the difference between the computed first average gray scale value and the value of that pixel is less than the predetermined threshold value.

22. The apparatus of claim 21, wherein the first filter kernel is applied if a first sub-condition, indicating that horizontal and vertical edges are to be preserved, is satisfied, the second filter kernel is applied if the first sub-condition is not satisfied but a second sub-condition, indicating that slanted edges are to be preserved, is satisfied, and the third filter kernel is applied if neither the first nor the second sub-condition is satisfied.

23. The apparatus of claim 22, wherein the first low-pass filter, represented by a weighted average gray scale value of the second pixel neighborhood, is applied if the second sub-condition is satisfied, and the second low-pass filter, represented by an average gray scale value of the first pixel neighborhood, is applied if the second sub-condition is not satisfied.

24. A machine-readable medium embodying a program of instructions for causing a machine to perform a method of producing an output representation of a mixed-mode document with reduced artifacts, the program of instructions comprising instructions for:

computing, for each of a plurality of pixels representing the document, a first average gray scale value of a first pixel neighborhood and a second average gray scale value of a second pixel neighborhood that overlaps the first pixel neighborhood;

comparing the difference between the computed first average gray scale value and a value of that pixel with a predetermined threshold value; and applying, based on the result of the comparison, either a median filter to the first pixel neighborhood, a first low-pass filter to the second pixel neighborhood, or a second low-pass filter to the first pixel neighborhood, to produce an output representation of the document with reduced artifacts.

25. The machine-readable medium of claim 24, wherein the pixel representation of the mixed-mode document is a high-resolution representation.

26. The machine-readable medium of claim 24, wherein the second pixel neighborhood is larger than the first pixel neighborhood.

27. The machine-readable medium of claim 24, wherein the median filter is applied if the difference between the computed first average gray scale value and the value of that pixel is greater than or equal to the predetermined threshold value.

28. The machine-readable medium of claim 27, wherein either the first low-pass filter or the second low-pass filter is applied based on a comparison between (i) the difference between the computed first average gray scale value and a gray scale value of that pixel and (ii) the difference between the computed second average gray scale value and the gray scale value of that pixel.

29. The machine-readable medium of claim 28, wherein the first low-pass filter is represented by a weighted average gray scale value of the second pixel neighborhood, and the second low-pass filter is represented by an average gray scale value of the first pixel neighborhood.

30. The machine-readable medium of claim 24, wherein the first average gray scale value is computed on a 3×3 neighborhood of pixels, centered on but excluding that pixel, and the second average gray scale value is computed on a 3×5 neighborhood centered on and double weighting that pixel.

31. A machine-readable medium embodying a program of instructions for causing a machine to perform a method of producing an output representation of a mixed-mode document with reduced artifacts, the program of instructions comprising instructions for:

computing, for each of a plurality of pixels representing the document, a first average gray scale value of a first pixel neighborhood and a second average gray scale value of a second pixel neighborhood that overlaps the first pixel neighborhood;

comparing the difference between the computed first average gray scale value and a value of that pixel with a predetermined threshold value; and applying, based on the result of the comparison, either a first filter kernel to the first pixel neighborhood, a second filter kernel to the first pixel neighborhood, a third filter kernel to the first pixel neighborhood, a first low-pass filter to the second pixel neighborhood, or a second low-pass filter to the first pixel neighborhood, to produce an output representation of the document with reduced artifacts.

32. The machine-readable medium of claim 31, wherein the pixel representation of the mixed-mode document is a low-resolution representation.

33. The machine-readable medium of claim 31, wherein the first filter kernel is weighted to preserve horizontal and vertical edges in the output representation, and the second filter kernel is weighted to preserve slanted edges in the output representation.

34. The machine-readable medium of claim 33, wherein either the first, second or third filter kernels is applied if the difference between the computed first average gray scale value and the value of that pixel is greater than or equal to the predetermined threshold value, and wherein either the first or second low-pass filter is applied if the difference between the computed first average gray scale value and the value of that pixel is less than the predetermined threshold value.

35. The machine-readable medium of claim 34, wherein the first filter kernel is applied if a first sub-condition, indicating that horizontal and vertical edges are to be preserved, is satisfied, the second filter kernel is applied if the first sub-condition is not satisfied but a second sub-condition, indicating that slanted edges are to be preserved, is satisfied, and the third filter kernel is applied if neither the first nor the second sub-condition is satisfied.

36. The machine-readable medium of claim 35, wherein the first low-pass filter, represented by a weighted average gray scale value of the second pixel neighborhood, is applied if the second sub-condition is satisfied, and the second low-pass filter, represented by an average gray scale value of the first pixel neighborhood, is applied if the second sub-condition is not satisfied.

* * * * *